Feb. 20, 1968  C. H. DIX  3,370,197
TRAVELLING WAVE TUBES

Filed Aug. 27, 1963  2 Sheets-Sheet 1

INVENTOR
CYRIL HENRY DIX
BY
ATTORNEYS

United States Patent Office 3,370,197
Patented Feb. 20, 1968

3,370,197
TRAVELLING WAVE TUBES
Cyril Henry Dix, Harrow, Middlesex, England, assignor to The M-O Valve Company Limited, London, England
Filed Aug. 27, 1963, Ser. No. 304,813
Claims priority, application Great Britain, Aug. 29, 1962, 33,237/62
5 Claims. (Cl. 315—3.5)

ABSTRACT OF THE DISCLOSURE

A high power, broad band travelling wave tube employing an annular electron beam, a "ring and bar" slow wave structure and a conductive tube surrounding and electrically insulated from the slow wave structure. The required relative radial dimensions of the beam, the slow wave structure and the conductive tube for improved performance are specified.

This invention relates to travelling wave tubes.

The invention relates particularly to travelling wave tubes of the kind comprising an envelope in which is housed an elongated slow wave structure along which an electromagnetic wave may be propagated in a forward wave mode, and means for projecting an electron beam along the length of said structure so as to interact with a wave propagated along said structure.

It is an object of the present invention to provide a travelling wave tube of the kind specified which may be operated at a relatively high power level so as to amplify signals over a wide band of frequencies.

According to the present invention, in a travelling wave tube of the kind specified said slow wave structure comprises a multiplicity of electrically conductive annular members which are disposed in spaced apart axial alignment, said members being serially connected by electrically conductive straps which respectively extend between adjacent pairs of said members in directions substantially parallel to the axis of said structure, each adjacent pair of said straps extending respectively from diametrically opposite positions on opposite sides of the annular member between them; the slow wave structure is coaxially surrounded at least along the major part of its length by an electrically conductive tube which is electrically insulated from the slow wave structure with respect to direct currents; and the electron beam is arranged to be of annular cross-section and to pass substantially coaxially through said slow wave structure, the arrangement being such that, at any point along the length of the conductive tube, the internal diameter of the conductive tube is between 1.25 and 1.5 times the mean diameter of said annular members and the mean diameter of the beam is between 0.5 and 0.9 times that of said annular members.

Normally the conductive tube will be housed within the envelope but in some cases the conductive tube may form part of the envelope.

In a preferred arrangement in accordance with the invention said slow wave structure comprises two sections each comprising a multiplicity of axially aligned annular members serially connected by conductive straps disposed as specified above, said two sections being axially aligned and so orientated that the straps in one section are displaced about the axis of the structure by an angle of approximately 90° with respect to the straps in the other section.

Figure 1:
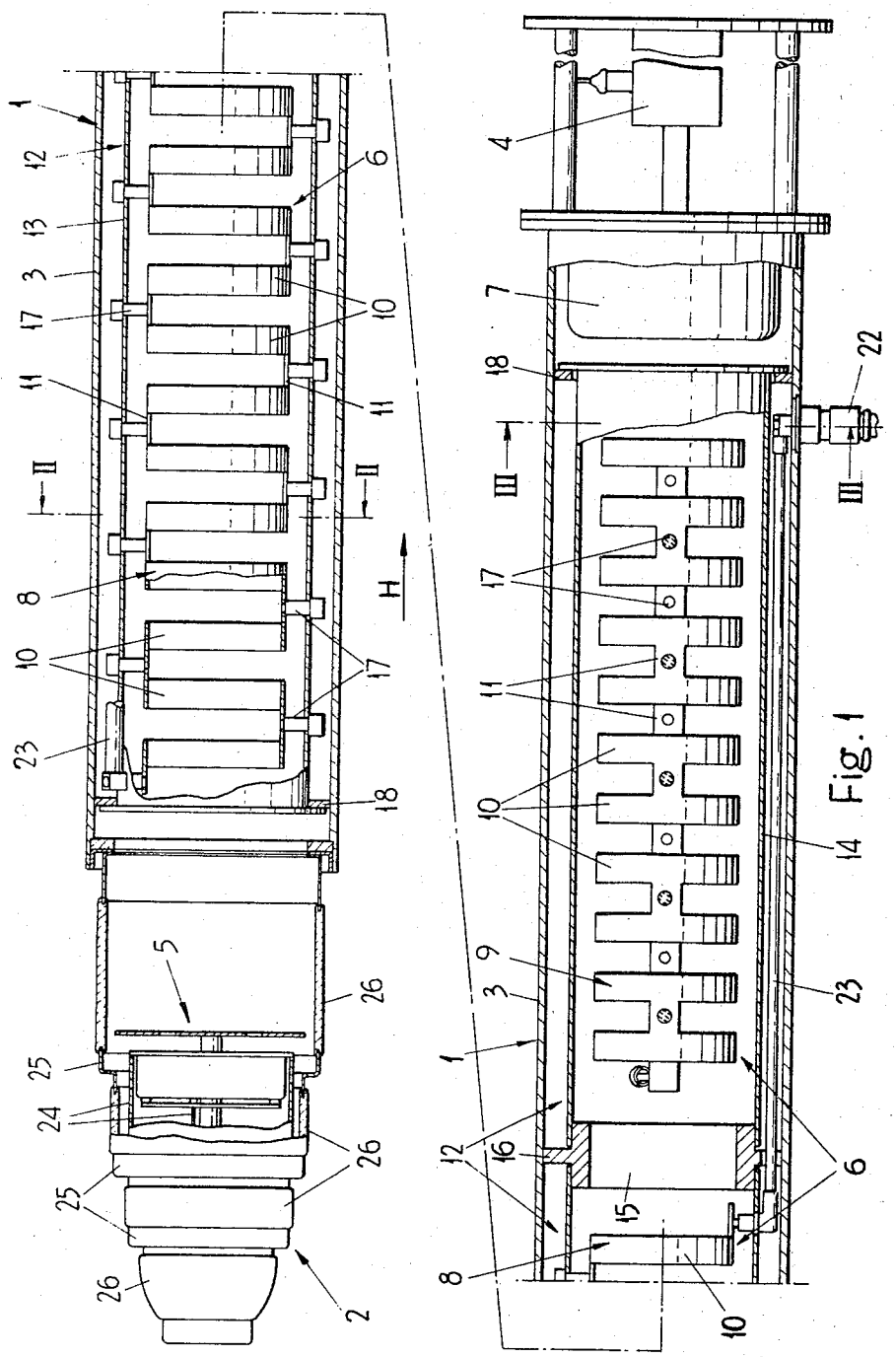
Figure 2:
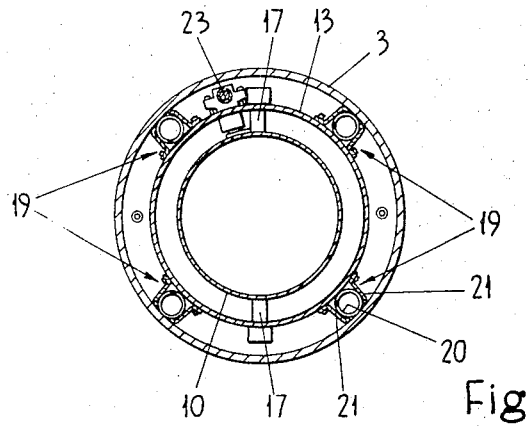
Figure 3:
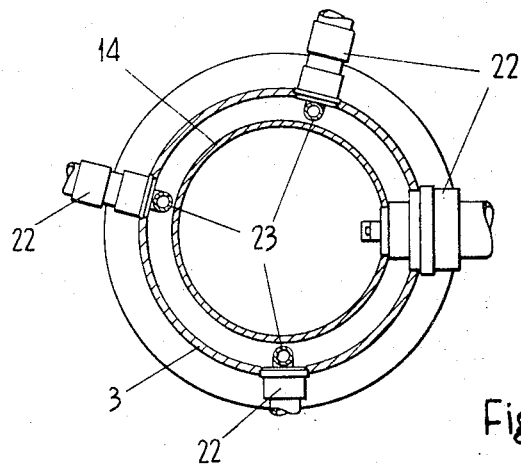
Figure 4:
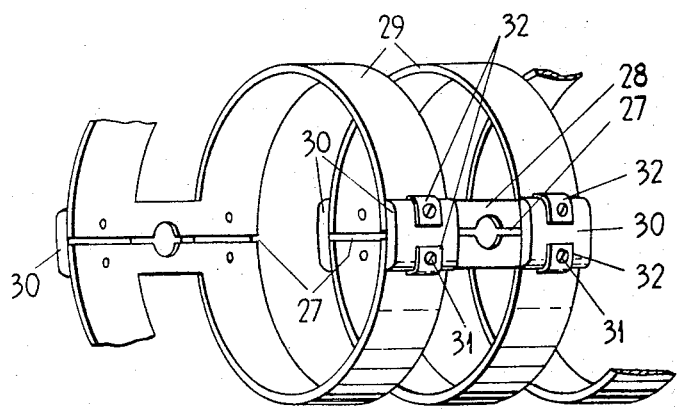

One travelling wave tube in accordance with the invention will now be described, by way of example reference to the accompanying drawings in which:

FIGURE 1 is a part-sectional view of the tube;
FIGURES 2 and 3 are respectively enlarged cross-sectional views of the tube along the lines II—II and III—III in FIGURE 1; and
FIGURE 4 is a perspective view of a portion of a modified form of the tube illustrated in FIGURES 1 to 3.

Referring now to FIGURES 1 to 3 the tube includes an evacuated envelope 1 comprising two sections 2 and 3. The section 2 is roughly frusto-conical in shape, having a length of about 43 centimetres, and opens at its wider end into the section 3 which is in the form of a metal tube, having a length of 160 centimetres and internal and external diameters of 20.3 centimetres and 21.6 centimetres respectively.

At its end remote from the section 2 the section 3 is connected to an ion pump 4 but is otherwise closed. The section 2 houses an electron gun 5 arranged to project an electron beam axially along the envelope 1, past a slow wave structure 6 housed in the section 3, so as to impinge on a collector electrode 7 disposed at the end of the section 3 remote from the section 2. The electron beam is of annular cross-section, having a mean diameter of 8.4 centimetres and a thickness of 1.37 centimetres, and is focussed by means of a magnetic focussing coil (not shown) disposed around the outside of the envelope 1, which produces a uniform magnetic field H directed parallel to the axis of the envelope 1.

The slow wave structure 6 is substantially centrally disposed between the electron gun 5 and the collector electrode 7 and comprises two sections, an input section 8 disposed nearer the electron gun 5 and an output section 9 disposed nearer the collector electrode 7.

The input section 8 comprises thirteen annular members 10 disposed in axial alignment at spacings of 2.67 centimetres from one another, each member 10 being formed from sheet metal 0.20 centimetre thick, having an external diameter of 12.07 centimetres and an axial length of 2.54 centimetres. The members 10 are serially connected by means of conductive straps 11 which respectively extend between adjacent pairs of the members 10, each adjacent pair of straps 11 extending from diametrically opposite positions on opposite sides of the member 10 between them. Each strap 11 is in the form of a piece of sheet metal 0.20 centimetre thick and 2.67 centimetres square bent to the same radius as the members 10, each strap 11 fitting between corresponding sections of the two members 10 it connects so as to be within the tubular volume enclosing the members 10.

The output section 9 of the slow wave structure 6 is of similar form to the input section 8 except that it includes eleven annular members 10 instead of thirteen.

The two sections 8 and 9 of the slow wave structure 6 are disposed in axial alignment, coaxial with the envelope 1, at a spacing of 15.37 centimetres from one another, the two sections 8 and 9 being so orientated that the longitudinal axes of the straps 11 of the section 8 lie in a plane at right angles to the plane of the longitudinal axes of the straps 11 of the section 9.

The slow wave structure 6 is coaxially surrounded by a tubular metal screen 12 comprising two sections 13 and 14, both formed from sheet metal, 0.318 centimetre thick, and having an external diameter of 16.51 centimetres. The two sections 13 and 14 have lengths of 75.26 and 68.78 centimetres respectively, and are respectively disposed around the sections 8 and 9 of the slow wave structure 6. The two sections 13 and 14 are joined by means of an annular metal collar 15, the end portions of the two sections 13 and 14 respectively overlapping the opposite ends of the collar 15 by 2.22 centimetres and the ends of the two sections 13 and 14 abutting against a flange 16 of width 1.27 centimeres formed at a central position on the external surface of the collar 15.

Each section 8 and 9 of the slow wave structure 6 is supported in its associated section 13 and 14 of the screen by means of silica rods 17 which respectively extend between the straps 11 and the screen 12 in directions perpendicular to the axis of the envelope 1. The outer end of each rod 17 is secured in an aperture in the appropriate section 13 or 14 of the screen 12 and the inner end of each rod 17 is of slightly smaller diameter than the rest of the rod 17 and fits into an aperture formed through the corresponding strap 11.

The screen 12 is supported coaxially within the section 3 of the envelope 1 by means of two metal rings 18 which respectively fit between the envelope 1 and the screen 12, one towards each end of the screen 12, and by means of the collar 15, the diameter of the flange 16 being such that the collar 15 is a good sliding fit in the section 3 of the envelope 1.

On each side of the collar 15, in the space between the screen 12 and the section 3 of the envelope, there are disposed four shorting bar structures 19, each set of four structures 19 being equally spaced around the circumference of the relevant section 13 or 14 of the screen. Each structure 19 includes a wire helix 20 formed from steel wire of diameter 0.081 centimetre, the helix 20 having a diameter of 2.06 centimetres, an external length just less than the associated section 13 or 14 of the screen 12 and 4 turns per centimetre. Each helix 20 is disposed within its axis parallel to the axis of the envelope 1 and is housed within a separate enclosure formed by two metal brackets 21 disposed one on either side of that helix 20. Each bracket 21 is of substantially the same length as the associated helix 20 and is substantially rectangular in shape with flanges extending in opposite directions from its two longer edges. One flange on each bracket 21 being bolted to the associated section 13 or 14 of the screen 12 and the other flange on each bracket 21 being in electrical contact with the section 3 of the envelope 1 and extending over the associated helix 20.

Four coaxial sockets 22 by means of which connection may respectively be made to the ends of the two sections 8 and 9 of the slow wave structure 6 are sealed through the section 3 of the envelope 1 adjacent the end of the section 9 of the slow wave structure 6 nearer the collector electrode 7. Coaxial leads 23 to these sockets 22 from the input section 8 of the slow wave structure 6 and the end of the output section 9 remote from the collector electrode 7 extend along the device between the envelope 1 and the screen 12.

Leads 24 from the electrodes of the electron gun 5 are respectively connected to metal rings 25 which form part of the section 2 of the envelope 1, these rings 25 being interposed between short glass sections 26 of the envelope 1 so as to be insulated from one another and the section 3 of the envelope 1. The metal rings 25 thus serve as terminals for the electrodes of the electron gun 5.

The collector electrode 7 is mounted in electrical connection with the section 3 of the envelope 1 so that this section 3 serves as a terminal for the collector electrode 7.

In operation of the travelling wave tube, a radio frequency input signal is applied via the appropriate coaxial socket 22 to the end of the input section 8 of the slow wave structure 6 adjacent the electron gun 5. As a result, velocity modulation of the electron beam is produced in known manner and an amplified radio frequency output signal may be derived from the tube via the coaxial socket 22 connected to the end of the output section 9 of the slow wave structure 6 nearer the collector electrode 7. The other two coaxial sockets 22 are respectively connected to two impedances (not shown) each having a value equal to the characteristic impedance of the circuit formed by the corresponding section of the slow wave structure 6 and the screen 12. By this means, oscillation due to feed back from the output section 9 to the input section 8 of the slow wave structure is prevented.

Oscillation due to electrical coupling between two sections 8 and 9 of the slow wave structure 6 as a result of the space between each section of the structure 6 and the screen 12 effectively forming a waveguide is prevented by virtue of the fact that the two sections are orientated with respect to one another as described above.

Undesirable electric coupling between parts of the tube via the space between the section 3 of the envelope 1 and the screen 12 is prevented by the presence of the shorting bar structures 19. In this space, the structures 19 effectively preventing the passage of electromagnetic waves of the relevant frequencies through this space.

In use of the tube described, by way of example, with the electron beam having a mean velocity corresponding to a voltage of 25 kilovolts and a current density of one ampere/square centimetre, a pulsed output of 250 kilowatts may be obtained in a frequency band centred on 400 megacycles per second, the device providing a gain of about 30 db with a variation in gain of ±5% over a frequency bandwidth of 150 megacycles per second.

As a result of the use of an electron beam having an annular cross-section rather than a circular cross-section, an electron beam of relatively high perveance is obtained. In consequence, for a given gain and output power, a beam accelerating voltage of lower value is required. The velocity of the electron beam is therefore lower and the length of the tube correspondingly smaller. It will be appreciated that this factor is of particular importance for tubes operating at relatively low frequencies.

The relatively large bandwidth obtained may be attributed mainly to the presence of the screen 12 surrounding the slow wave structure 6 of the device, which makes the slow wave structure 6 less dispersive than would be the case in the absence of the screen 12, and the use of a hollow electron beam of high perveance which results in efficient coupling between the beam and a wave propagated along the slow wave structure 6.

In a modified form of the tube described above with reference to FIGURES 1 to 3, the slow wave structure is modified to inhibit the propagation along it of electromagnetic waves in an asymmetric mode. A portion of the slow wave structure of such a modified tube is illustrated in FIGURE 4. Referring now to FIGURE 4, in the modified tube a series of slots 27 extending in a direction parallel to the axis of the tube are cut in each section of the slow wave structure, there being a separate slot 27 extending centrally along the length of each strap 28 and through the corresponding parts of the two annular members 29 joined by that strap 28. Each slot 27 has a width of 0.157 centimetre and each slotted part of each annular member 29 is bridged by a separate approximately square ceramic member 30 having a thickness of 0.450 centimetre and main faces 2.54 centimetres square. Each member 30 is formed with one of its main faces having a curvature corresponding to that of the external surface of the annular members 29, this face of each member 30 being thinly coated with a conductive material and fitting in contact with the external surface of the associated annular member 29. Each member 30 is secured to the associated member 29 by means of two bolts 31 which screw into tapped holes formed in the associated member 29, one on either side of the slot 27, the bolts 31 each being provided with a locking washer 32 which also serves to protect the ceramic.

It will be appreciated that by virtue of the presence of the slots 27 in the annular members 29 and the presence of the ceramic members 30, the impedance of each member 29 is relatively high compared with that of the annular members 10 of the slow wave structure 6 of the tube described above with reference to FIGURES 1 to 3. This has the desired effect of inhibiting the propagation of electromagnetic waves in asymmetric modes along the slow wave structure of the modified tube.

I claim:
1. A travelling wave tube comprising: an evacuated envelope; an elongated slow wave structure along which an electromagnetic wave may be propagated in a forward wave mode, said structure being housed within the envelope and comprising a multiplicity of electrically conductive annular members which are disposed in spaced apart axial alignment, said members being serially connected by electrically conductive straps which respectively extend between adjacent pairs of said members in directions substantially parallel to the axis of said structure, each adjacent pair of said straps extending respectively from diametrically opposite positions on opposite sides of the annular member between them; an electrically conductive tube coaxially surrounding at least the major part of the length of said slow wave structure, the internal diameter of said tube at any point along its length being between 1.25 and 1.5 times the mean diameter of said annular members; and means for projecting an electron beam of substantially annular cross-section substantially coaxially through said slow wave structure so as to interact with a wave propagated along said structure; the mean diameter of said beam at any point along its length being between 0.5 and 0.9 times that of said annular members; said slow wave structure being supported within the conductive tube by means of rods of insulating material which respectively extend between said straps and the conductive tube in directions perpendicular to the axis of the slow wave structure.

2. A travelling wave tube according to claim 1 wherein the conductive tube is surrounded by a part of the envelope which is made of electrically conductive material and means are disposed in the space between the envelope and said conductive tube for effectively preventing undesirable electric coupling between different parts of the slow wave structure via said space.

3. A travelling wave tube according to claim 1 wherein said slow wave structure comprises two sections each comprising a multiplicity of axially aligned annular members serially connected by said conductive straps, said two sections being axially aligned and so orientated that the straps in one section are displaced about the axis of the structure by an angle of approximately 90° with respect to the straps in the other section.

4. A travelling wave tube comprising: an evacuated envelope; an elongated slow wave structure which an electromagnetic wave may be propagated in a forward wave mode, said structure being housed within the envelope and comprising two sections each comprising a multiplicity of electrically conductive annular members which are disposed in spaced apart axial alignment, said members being serially connected by electrically conductive straps which respectively extend between adjacent pairs of said members in directions substantially parallel to the axis of said structure, each adjacent pair of said straps extending respectively from diametrically opposite positions on opposite sides of the annular member between them, said two sections being axially aligned and so orientated that the straps in one section are displaced about the axis of the structure by an angle of approximately 90° with respect to the straps in the other section; an electrically conductive tube coaxially surrounding at least the major part of the slow wave structure and surrounded by a part of the envelope which is made of electrically conductive material, the internal diameter of said tube at any point along its length being between 1.25 and 1.5 times the mean diameter of said annular members; means housed within the space between the envelope and said tube for effectively preventing undesired electric coupling between different parts of said slow wave structure via said space; means for projecting an electron beam substantially coaxially through said slow wave structure so as to interact with a wave propagated along said structure, the mean diameter of the beam at any point along its length being between 0.5 and 0.9 times that of said annular members; a plurality of connectors sealed through the envelope, the connectors all being disposed adjacent one another; and leads to the connectors from different parts of the slow wave structure extending along the travelling wave tube via a space between the envelope and said conductive tube.

5. A travelling wave tube comprising: an evacuated envelope; an elongated slow wave structure along which an electromagnetic wave may be propagated in a forward wave mode, said structure being housed within the envelope and comprising two sections each comprising a multiplicity of electrically conductive annular members which are disposed in spaced apart axial alignment, said members being serially connected by electrically conductive straps which respectively extend between adjacent pairs of said members in directions substantially parallel to the axis of said structure, each adjacent pair of said straps extending respectively from diametrically opposite positions on opposite sides of the annular member between them, each strap having formed through it a slot extending along its length in a direction substantially parallel to the axis of the slow wave structure, the slot extending also across the width of the two annular members joined by that strap, and each slot in each annular member being electrically bridged by a respective element having a relatively high impedance compared with the remainder of that annular member, said two sections being axially aligned and so orientated that the straps in one section are displaced about the axis of the structure by an angle of approximately 90° with respect to the straps in the other section; an electrically conductive tube coaxially surrounding at least the major part of the slow wave structure and surrounded by a part of the envelope which is made of electrically conductive material, the internal diameter of said tube at any point along its length being between 1.25 and 1.5 times the mean diameter of said annular members; means housed within the space between the envelope and said tube for effectively preventing undesired electric coupling between different parts of said slow wave structure via said space; means for projecting an electron beam substantially coaxially through said slow wave structure so as to interact with a wave propagated along said structure, the mean diameter of the beam at any point along its length being between 0.5 and 0.9 times that of said annular members; a plurality of connectors sealed through the envelope, the connectors all being disposed adjacent one another; and leads to the connectors from different parts of the slow wave structure extending along the travelling wave tube via a space between the envelope and said conductive tube.

References Cited

UNITED STATES PATENTS

| | | | |
|---|---|---|---|
| 2,632,130 | 3/1953 | Hull | 315—3 |
| 2,937,311 | 5/1960 | Chodorow | 315—39.3 |
| 2,939,996 | 6/1960 | Zublin et al. | 315—39.3 |
| 2,957,103 | 10/1960 | Birdsall | 315—3.6 |
| 3,069,588 | 12/1962 | Skowron et al. | 315—3.6 |
| 2,922,067 | 1/1960 | Van Dien | 315—3.5 |

HERMAN KARL SAALBACH, *Primary Examiner.*

ELI LIEBERMAN, *Examiner.*

M. NUSSBAUM, *Assistant Examiner.*